Feb. 4, 1958  R. W. HAUTZENROEDER  2,822,071
CLUTCH MECHANISM
Filed March 17, 1954  2 Sheets-Sheet 1

INVENTOR.
Richard W. Hautzenroeder
BY
Carlson, Pitzner, Hubbard & Wolfe
Att'ys

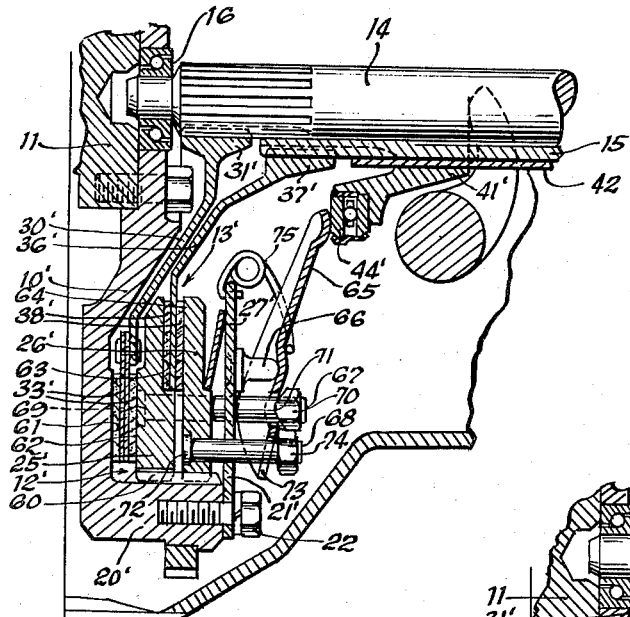

United States Patent Office 2,822,071
Patented Feb. 4, 1958

2,822,071

CLUTCH MECHANISM

Richard W. Hautzenroeder, Detroit, Mich., assignor, by mesne assignments, to Massey-Harris-Ferguson Inc., Racine, Wis., a corporation of Maryland Application March 17, 1954, Serial No. 416,734

5 Claims. (Cl. 192—48)

The invention relates to friction clutches generally and more particularly to an improved dual friction clutch mechanism providing independently engageable and disengageable drives for two shafts from a common source of power.

One object of the invention is to provide a clutch mechanism of the above general character utilizing a minimum number of parts, all of which can be easily and cheaply produced by mass production methods and which can be assembled easily.

Another object is to provide an improved clutch mechanism embodying two independently acting clutches and actuating mechanism whereby those clutches may be disengaged sequentially upon movement of a common actuating member in one direction.

A further object is to provide a dual clutch mechanism which by reason of its efficiency and dependability in operation, its ruggedness and ability to stand up under hard usage, and the ease with which it may be serviced, is particularly well suited for use in agricultural tractors.

Other objects and advantages of the invention will become apparent from the following detailed description of the preferred embodiments illustrated in the accompanying drawings in which Figure 1 is a fragmentary sectional view taken axially of a preferred form of dual clutch mechanism embodying the features of the invention, the mechanism being shown with both clutches engaged.

Fig. 4 is a fragmentary sectional view of a modified form of the clutch mechanism showing both clutches engaged.

Fig. 5 is a fragmentary sectional view similar to Fig. 4 showing the front clutch disengaged and the rear clutch engaged.

Fig. 6 is a view similar to Figs. 4 and 5 showing both clutches disengaged.

Figure 1:
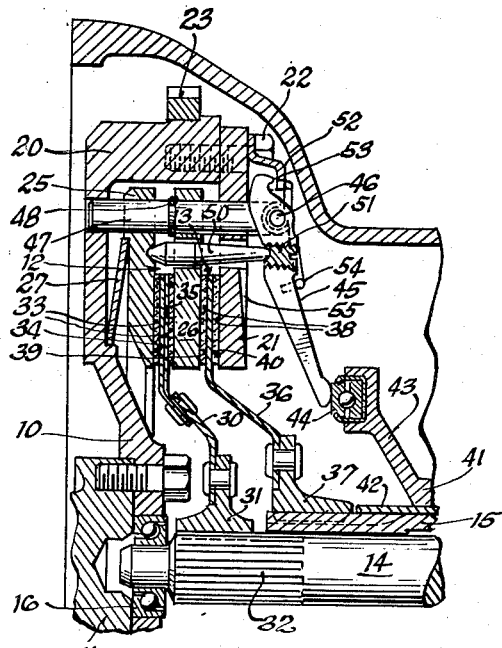

While the invention has been shown and will be described herein as embodied in a preferred form of dual clutch mechanism and a modification thereof, it is to be understood that the detailed disclosure is merely exemplary and is not intended to limit the invention. The intention is to cover all modifications and alternative constructions falling within the spirit and scope of the invention as expressed in the appended claims.

For purposes of illustration, the exemplary clutch mechanism has been shown as having a rotatable driving member comprising a flywheel 10 adapted to be bolted or otherwise rigidly secured to one end of an engine crankshaft 11. The exemplary clutch mechanism includes two independently engageable and disengageable clutches, namely, a front clutch 12 and a rear clutch 13 which respectively provide driving connections from the driving member to two separate shafts 14 and 15. As herein shown, the shaft 15 is tubular and the shaft 14 extends coaxially through it and is piloted at its forward end in a bearing 16 seated in a recess in the flywheel 10. The front clutch 12, in this instance, is operatively associated with the inner shaft 14 while the rear clutch 13 is associated with the outer shaft 15. When incorporated in a tractor or comparable vehicle, the shaft 14 may be utilized advantageously to drive the ground wheels of the tractor through change-speed gearing while the shaft 15 is utilized to drive a pump or power take-off shaft, or both, independently of the transmission. The improved clutch mechanism provides efficient and convenient means whereby the tractor drive may be interrupted as for shifting gears without disturbing the pump and power take-off drive. Alternatively, both drives may be interrupted when desired.

In accordance with the invention, the clutches 12 and 13 are incorporated in the mechanism in a manner which simplifies the construction of the parts, reduces the number of parts required and provides a very rugged and dependable structure capable of operating efficiently under the severe conditions imposed on such mechanisms in the tractor field. More particularly, the parts are constructed and related so that those requiring precision machining are of easily handled size and shape and capable of being produced by ordinary machining processes.

As herein shown, the flywheel 10 is formed with a peripheral flange 20 extending rearwardly from the face of the wheel. Mounted on and extending inwardly from the flange 20 is an annular casing member 21 rigidly secured to the flywheel as by screws 22 so as to constitute a unitary part of the driving member. The casing member 21 is thus spaced from the rear face of the flywheel and with it defines a compartment for the clutch elements as will appear presently. Teeth 23 may be formed directly on the flange of the flywheel or on a suitable ring carried thereby for co-operation with a starter gear.

Enclosed within the compartment above mentioned are a pair of axially shiftable clutch plates 25 and 26 disposed coaxially of the flywheel and constrained to rotate with it as a unit. Spring means herein shown as a flat annular or Bellville spring 27 interposed between the flywheel and the front clutch plate 25 urges both clutch plates rearwardly toward the casing member 21.

In the exemplary clutch mechanism, the front clutch 12 has its driven element interposed between the clutch plates 25 and 26 to be frictionally driven thereby. The front clutch member as shown comprises a sheet metal disc 30 having its central portion offset and riveted or otherwise fixed to a hub 31 which is non-rotatably secured on the inner shaft 14 as by interengaging splines 32. The outer marginal portion of the disc 30 extends between the clutch plates 25 and 26 and is provided on each side with suitable friction facings 33 for co-operation with the opposed faces of the clutch plates which are machined to present friction driving surfaces 34 and 35.

The driven element of the rear clutch 13, in this instance, is interposed between the rear clutch plate 26 and the adjacent face of the casing member 21. This driven element comprises a sheet metal disc 36 having its offset central portion riveted to a hub 37 splined or otherwise non-rotatably fixed on the outer shaft 15. The rim portion of the disc is fitted on both sides with annular friction facings 38 for co-operation with opposed friction driving surfaces 39 and 40 formed respectively on the clutch plate 26 and the casing member 21.

From the foregoing description, it will be seen that the single spring 27 serves to maintain both clutches engaged. It is also to be noted that, in this form of the clutch mechanism, the driving surfaces are all formed of parts substantially smaller than the flywheel and separable therefrom. This simplifies manufacture and also facilitates servicing of the clutch as the clutch plates or casing member can easily be replaced if the friction surfaces become excessively worn.

Actuation of the clutches 12 and 13 is effected in a simple and expeditious manner through movement of a single shiftable actuating member which, in its movement in one direction, disengages the clutches and in its return movement re-engages them. The actuation may be sequential or simultaneous as required, depending on the adjustment of the mechanism to be described hereinafter.

Figure 2:
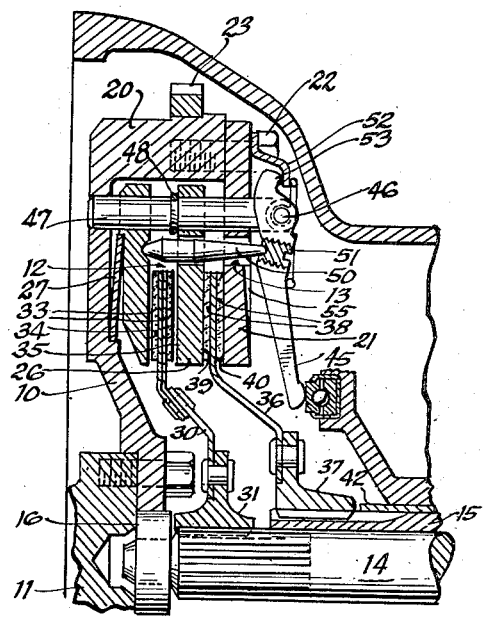
Fig. 2 is a fragmentary sectional view similar to Fig. 1 showing the front clutch disengaged and the rear clutch engaged.
Figure 3:
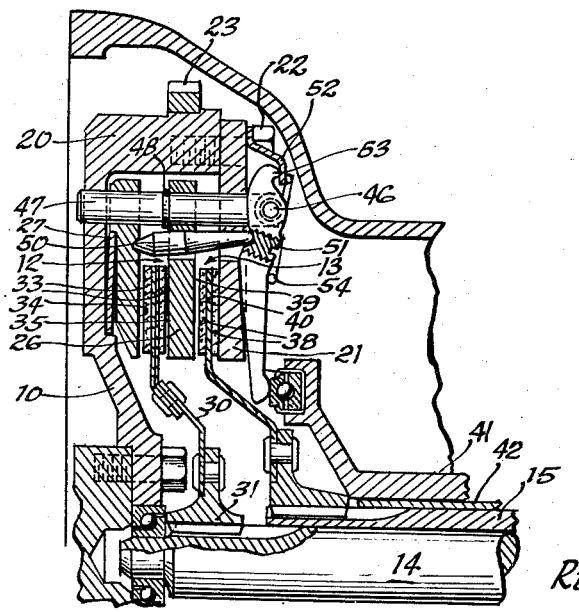
Fig. 3 is a fragmentary sectional view similar to the preceding figures showing both clutches disengaged.

In the exemplary clutch mechanism shown in Figs. 1–3, the actuating member comprises a sleeve 41 shiftable axially on the tubular housing 42 enclosing the shafts 14 and 15. The shifting of the sleeve may be effected in conventional manner by means of a hand lever or foot pedal. The sleeve 41 has a bell-shaped extension 43 at its forward end upon which is mounted a rotatable thrust ring 44 positioned to coact with the inner ends of a series of clutch throw-out levers 45 mounted on and rotatable with the driving member of the clutch mechanism.

The throw-out levers 45, of which any suitable number may be employed, are arranged radially of the clutch mechanism and are preferably uniformly spaced apart around the back of the mechanism. For effecting the independent actuation of the clutches, each lever is provided with three fulcrums. Thus, each lever is pivoted intermediate its ends on a pin 46 carried on the projecting end of a thrust rod 47 slidably received in alined recesses in the flywheel 10, the clutch plates 25 and 26 and the casing member 21. In addition to fulcruming the throw-out lever 45, the rods 47 drivingly connect the clutch plates to the flywheel for rotation with it as a unit. Each thrust rod is formed to provide a rearwardly facing abutment engageable with the front face of the clutch plate 26, the purpose of which will appear as the description proceeds. This abutment in the present instance is formed by a snap ring 48 engaged in a circumferential groove in the rod.

A second fulcrum for each throw-out lever is provided by a thrust pin 50 which extends from the clutch plate 25 through clearance holes in the clutch plate 26 and casing member 21 to abut the lever inwardly of its fulcrum on the rod 47. Preferably, the thrust pin is formed with tapered ends for seating in conical depressions or sockets in the front clutch plate and the throw-out lever which permits limited tilting of the pins as the lever is rocked. As herein shown, the socket on the lever is formed in the end of an adjusting screw 51 threaded through the lever.

A third fulcrum for each throw-out lever 45 is provided by an abutment on the driving member positioned for engagement by the outer end of the lever. The abutment, as shown, is in the form of a metal stamping 52 adapted to be secured to the flywheel assembly by the screws 22 securing the casing member 21 in place. The stamping 52 has a portion overlying the outer end of the lever 45 which is preferably formed to present a rearwardly facing tip 53 affording point contact with the overlying abutment. A torsion spring 54 having its central portion encircling the pin 46 and its opposite ends respectively overlying the lever 45 and the abutment 52 urges the lever in a direction to carry the tip toward the abutment. The spring 54, however, is a relatively weak spring and is ineffective to overcome the force exerted by the spring 27 but merely serves to hold the elements securely in place.

With the actuating member 41 in the position shown in Fig. 1, spring 27 holds both the clutch 12 and the clutch 13 engaged and both of the shafts 14 and 15 are driven.

As the actuating member is shifted forwardly or to the left as viewed in the drawing, throw-out levers 45 rock about the fulcrums provided by the pin 46 and apply pressure through the thrust pins 50 to shift the front clutch plate 25 forwardly or to the position shown in Fig. 2 in which the front clutch 12 is disengaged. Rear clutch 13 remains engaged since the force exerted by the spring 27 is transmitted back through the thrust pins, the levers 45 and the rods 47 to exert a rearward pull on the latter effective to maintain the clutch plate 26 in driving engagement with the rear clutch element. Accordingly, as long as the control member remains in the position shown in Fig. 2, the drive for the inner shaft 14 is interrupted while the drive for the outer shaft 15 continues effective.

Further advance of the actuating member 41 from the position shown in Fig. 2 rocks the throw-out levers 45 about fulcrums defined by the lever tips 53 engaging the abutments 52. The rods 47 are accordingly shifted forwardly to relieve the pressure on the clutch plate 26 thus disengaging the rear clutch 13. Forward movement of the front clutch plate 25 by the thrust pins 50 continues and consequently the front clutch 12 is maintained disengaged. In the particular clutch illustrated, the casing member 21 is formed with radial grooves affording clearance for the throw-out levers when rocked to their full advanced positions as shown in Fig. 3.

Upon release of the clutch actuating member 41, the clutches 12 and 13 are re-engaged in the reverse order. As the actuating member retreats, the spring 27 shifts the entire clutch plate assembly rearwardly and the rear clutch is re-engaged when the parts reach the positions in which they are shown in Fig. 2. Finally, as the parts approach the normal rest position shown in Fig. 1, front clutch 12 is re-engaged, thereby re-establishing the normal driving condition of the clutch mechanism.

The improved clutch mechanism can be quickly and easily adjusted to provide for simultaneous actuation of the front and rear clutches if desired. To provide such operation, the adjusting screws 51 are turned back so that the tips 53 of the throw-out levers engage their abutments immediately upon the swinging of the levers from normal rest position. Accordingly, both the rods 47 and thrust pins 50 advance with the levers, the pins advancing at a slightly greater rate because of their distance from the lever fulcrums. Both clutch plates are thus relieved of spring pressure at substantially the same time and consequently both clutches are disengaged. When the mechanism is so adjusted, re-engagement of the clutches also takes place substantially simultaneously.

The modified form of the dual clutch mechanism shown in Figs. 4–6 of the drawings, utilizes substantially the same type of elements as the mechanism above described and operates in the same general manner. Thus the mechanism comprises a driving member including a flywheel 10' fixed on the engine crankshaft 11 and having an upstanding peripheral flange 20', to the rear face of which is attached an inwardly projecting annular casing member 21'. The compartment defined by the flywheel and casing member houses a pair of axially shiftable clutch plates 25' and 26' which, in this instance, are rotatably driven from the flywheel through interengaging teeth or splines 60 on the marginal edges of the plates and the adjacent wall of the flange 20'.

In this particular form of clutch mechanism, the driven element of the front clutch 12' is interposed between the rear face of the flywheel 10' and the front clutch plate 25'. Similarly, the driven element of the rear clutch 13' is interposed between the two clutch plates 25' and 26' while the clutch engaging spring 27' acts between the casing member 21' and the rear clutch plates 26'. It will thus be noted that in this mechanism the two clutches are engaged by the forward biasing of the clutch plates and disengagement is effected by rearward movement of the plates.

The driven element of the front clutch, as shown, comprises a disc portion 30' with a hub 31' splined on the inner shaft 14 which is piloted at its forward end in the bearing 16 seated in an axial recess in the flywheel. The marginal edge portion of the disc 30' extends between the flywheel and the front clutch plate 25' and is fitted with the usual friction facings 33'. To accommodate this arrangement of the parts, the rear face of the flywheel 10' is machined to present a friction driving surface 61 opposed to a similar friction driving surface 62 on the front face of the clutch plate 25'.

The driven element of the rear clutch 13' likewise comprises a disc 36' with a hub portion 37' splined to the outer shaft 15. The marginal edge portion of the disc 36' extends between the two clutch plates 25' and 26' and is fitted with friction facings 38' for coaction with driving surfaces 63 and 64 on the opposed faces of the respective clutch plates.

Disengagement and re-engagement of the clutches is effected through the medium of a series of throw-out levers 65 fulcrumed on lugs 66 projecting from the back of the casing member 21', and operatively connected with the respective clutch plates 25' and 26' by means of pull rods 67 and 68, one pair of which is provided for each throw-out lever. The rod 67, as shown, has a head 69 at its forward end seated in a recess in the front face of the clutch plate 25'. The shank portion of the rod extends rearwardly through clearance holes of the clutch plates 25' and 26', the casing member 21' and the intermediate portion of the associated lever 65. A nut 70 threaded on the end of the rod overlies the lever and is engageable by it when rocked toward operated position. To provide a fixed pivot line and avoid chaffing, the lever is preferably formed with a transverse groove in its outer face and the adjacent face of the nut is tapered to present a transverse ridge 71 for engagement in the groove.

The pull rods 68 are arranged parallel to the rods 67 but are spaced outwardly therefrom. Each rod 68 has a head 72 at its inner end seated in a recess in the front face of the clutch plate 26'. The shank portion of the rod extends rearwardly through clearance holes in the clutch plate and the casing member 21' and through a slot 73 in the end of the associated throw-out lever. A nut 74 threaded on the rod overlies the sides of the slot for engagement by the lever as it swings to operated position. As herein shown, the throw-out levers are held in assembled relation with the other parts of the mechanism by torsion spring 75 acting between the casing member 21' and the respective levers.

With the parts constructed and arranged as above described and with the nuts 70 and 74 adjusted to the positions shown in Fig. 4 of the drawings, both clutches will be engaged by the action of the spring 27' when the actuating member 41' is in its normal rest position as shown. Under such conditions the throw-out levers are held by their springs 75 in engagement with the nuts 70 on the front clutch pull rods 67. The force exerted by the springs 75, however, is not sufficient to overcome that exerted by the clutch spring 27'. It will be observed that in this condition of the mechanism there is substantial clearance between the nuts 74 on the rear clutch pull rods and the adjacent ends of their associated throw-out levers.

As the throw-out levers are rocked forwardly by the advance of the actuating member, the front clutch plate 25' is retracted from the flywheel face thus freeing the front clutch driven element from the pressure of the spring 27' and thereby disengaging the front clutch 12'. With the parts shifted to the positions shown in Fig. 5, the front clutch 12' is fully disengaged but the rear clutch remains engaged. Furthermore, the clearance between the throw-out levers and the nuts 74 has been taken up.

Continued advance of the actuating member from the position shown in Fig. 5, now shifts both pull rods rearwardly and consequently retracts both clutch plates. Since the lever arms acting on the nuts 74 are substantially longer than those acting on nuts 70, the pull rods 68 will be retracted faster than the rods 67. Consequently the rear clutch 26' will not only move rearwardly relative to the flywheel but will be retracted from the front clutch plate 25' thereby relieving pressure on the driven element of the rear clutch 13'. With the parts shifted to the position shown in Fig. 6, both clutches will be disengaged.

Upon release of the actuating member, spring 27' acts to advance the clutch plate assembly and re-engage the clutches in the reverse order. Thus, when the clutch plates return to the position shown in Fig. 5, the rear clutch 13' is re-engaged and as the parts reach normal rest position, as shown in Fig. 4, the front clutch is also re-engaged.

The improved clutch mechanism may be adjusted to provide for substantially simultaneous disengagement and re-engagement of the two clutches, if desired. To provide for such operation, the nuts 74 on the rear clutch pull rods 68 are screwed down until they engage the throw-out levers when the latter are in the normal rest position shown in Fig. 4. Consequently, when the levers are rocked forwardly, both pull rods are retracted with the rods 68 moving farther than the companion rods so that the front clutch plate is retracted from the flywheel face and the rear clutch plate is retracted from the front clutch plate at substantially the same time. Re-engagement of the clutches takes place substantially simultaneously upon release of the actuating member.

It will be apparent from the foregoing that the invention provides a dual friction clutch of novel and advantageous construction for independently driving two shafts from a common source of power. The improved clutch is made up of relatively few parts, all of which are of simple construction and capable of being produced by inexpensive machining or stamping operations. While of simple construction, the mechanism is efficient and reliable in operation and sufficiently rugged to operate for long periods of time without attention under the hard usage to which such mechanisms are subjected when incorporated in agricultural tractors.

I claim as my invention:

1. In a dual clutch mechanism, in combination, a rotatable driving member presenting a friction driving surface coaxial with its axis of rotation, a pair of clutch plates supported for rotation with said member and for axial movement toward and from said driving surface, a first driven clutch element interposed between said surface and the adjacent plate, a second driven clutch element interposed between said adjacent plate and the other plate, spring means acting on said other plate urging both plates into clutch engaging relation to said driven elements, a series of pins each having an abutment engageable with one face of said adjacent plate, a second series of pins engageable with the opposed face of said other plate, a lever pivotally connected to each pin of said series and operative when rocked in one direction to fulcrum on a pin of said second series to shift said other plate to disengaged position while maintaining the adjacent plate in engaged position, and means on said member defining an abutment upon which said levers fulcrum on continued rocking in said one direction to shift the pins of said first series in a direction to effect disengagement of said adjacent plate.

2. A dual clutch mechanism comprising, in combination, a rotatable driving member, a pair of clutch plates supported in coaxial alinement with said member for rotation with it as a unit and for independent movement axially thereof, a first driven clutch element interposed between the driving member and one of said plates, a second driven clutch element interposed between the two plates, spring means acting on said plates to maintain them in driving engagement with said elements, an actuating member movable axially of said driving member, means including a lever having a first fulcrum operative upon initial movement of said actuating member for applying a force to one of said plates in a direction to disengage the drive for the adjacent clutch element and for simultaneously exerting a force on the other plate in a direction to maintain the drive for the other clutch element, said lever having a second fulcrum operative upon further movement of said actuating member to interrupt the application of force to the other plate and thereby disengage the drive for said other clutch element.

3. A dual clutch mechanism comprising, in combination, a rotatable driving member, a pair of clutch plates supported in coaxial alinement with said member for rotation with it as a unit and for independent movement axially thereof, a first driven clutch element interposed between the driving member and one of said plates, a second driven clutch element interposed between the two plates, spring means acting on said plates to maintain the elements drivingly engaged, an actuating member movable axially of said driving member, means including a series of pivoted levers interposed between said actuating member and said clutch plates operative in the initial movement of the actuating member to exert a force on one clutch plate in a direction to disengage one of the clutch elements, while simultaneously exerting an equal force on the other clutch plate in a direction to maintain the drive for the other clutch element, said last mentioned means being operative upon further movement of the actuating member to maintain the application of force to said one clutch plate and interrupt the application of force to said other clutch plate whereby to disengage the drive for the other clutch element.

4. A dual clutch mechanism comprising, in combination, a driving member including a flywheel having a rigidly attached casing member spaced from one face of the flywheel, a pair of clutch plates mounted between the flywheel and the casing member for rotation with them as a unit and for independent movement axially of the driving member, a first driven clutch element interposed between the inner face of said casing member and the opposed face of the adjacent clutch plate, a second driven clutch element interposed between the two clutch plates, spring means interposed between said driving member and said other clutch plate urging both plates in a direction to drivingly engage both clutch elements, a series of throwout levers each having a first fulcrum on a member operatively connected with one of said clutch plates and a second fulcrum rigid with said driving member, means connecting each of said levers with the other clutch plate effective to retract that plate and disengage the drive for the associated clutch element in response to the rocking of the levers about their first fulcrums, said levers being operative when rocked on their second fulcrums to shift the members providing said first fulcrums in a direction to relieve pressure on said one clutch plate and thereby effect disengagement of the clutch element associated therewith.

5. A dual clutch mechanism comprising, in combination, a driving member including a flywheel having a rigidly attached casing member spaced from one face of the flywheel, a pair of clutch plates mounted between the flywheel and the casing member for rotation with them as a unit and for independent movement axially of the driving member, a first driven clutch element interposed between the inner face of said casing member and the opposed face of the adjacent clutch plate, a second driven clutch element interposed between the two clutch plates, spring means interposed between said driving member and said other clutch plate urging both plates in a direction to drivingly engage both clutch elements, a series of throwout levers each rockable first about one fulcrum and then about another fulcrum spaced from said one fulcrum, means interposed between each lever and the adjacent clutch plate operative when the levers are rocked about said one fulcrum for shifting the adjacent plate in a direction to disengage the associated clutch element, said levers being operative when rocked about their other fulcrums to shift the first fulcrums in a direction to relieve pressure on the other clutch plate and thereby disengage the clutch element associated with that plate.

References Cited in the file of this patent

UNITED STATES PATENTS

| 1,705,032 | Short | Mar. 12, 1929 |

FOREIGN PATENTS

| 662,848 | Germany | May 17, 1936 |
| 887,589 | Germany | Aug. 24, 1953 |
| 457,023 | Great Britain | Nov. 19, 1936 |